United States Patent
Ramos Piedrahita

(10) Patent No.: US 9,914,432 B2
(45) Date of Patent: Mar. 13, 2018

(54) SHUT OFF GASOLINE LINE

(71) Applicant: Mario Ramos, Los Angeles, CA (US)

(72) Inventor: Mario Ramos Piedrahita, Los Angeles, CA (US)

( * ) Notice: Subject to any disclaimer, the term of this patent is extended or adjusted under 35 U.S.C. 154(b) by 136 days.

(21) Appl. No.: 14/803,699

(22) Filed: Jul. 20, 2015

(65) Prior Publication Data

US 2016/0272151 A1 Sep. 22, 2016

Related U.S. Application Data

(60) Provisional application No. 62/058,522, filed on Oct. 1, 2014.

(51) Int. Cl.
| | | |
|---|---|---|
| *B60R 25/04* | (2013.01) | |
| *B60R 25/042* | (2013.01) | |
| *F02D 41/04* | (2006.01) | |
| *F16K 31/02* | (2006.01) | |
| *F16K 1/12* | (2006.01) | |
| *F02D 17/04* | (2006.01) | |
| *F02D 33/00* | (2006.01) | |

(52) U.S. Cl.
CPC ............ *B60R 25/042* (2013.01); *B60R 25/04* (2013.01); *F02D 17/04* (2013.01); *F02D 41/042* (2013.01); *F16K 1/12* (2013.01); *F16K 31/02* (2013.01); *F02D 33/006* (2013.01)

(58) Field of Classification Search
CPC .............................. B60R 25/04; B60R 25/042
USPC ..................... 340/426.11, 426.12; 123/198 B
See application file for complete search history.

(56) References Cited

U.S. PATENT DOCUMENTS

| | | | | |
|---|---|---|---|---|
| 3,112,004 | A * | 11/1963 | Neaville | G08C 23/04 180/167 |
| 3,580,353 | A * | 5/1971 | Thompson | F01L 1/00 180/167 |
| 4,878,050 | A * | 10/1989 | Kelley | G08G 1/087 180/167 |
| 5,486,806 | A * | 1/1996 | Firari | B60R 25/042 180/284 |
| 5,722,452 | A * | 3/1998 | Gilmore | B60R 25/042 137/354 |
| 5,861,799 | A * | 1/1999 | Szwed | B60R 25/04 123/179.2 |
| 6,072,248 | A * | 6/2000 | Muise | B60R 25/04 180/287 |
| 6,505,101 | B1 * | 1/2003 | Brill | B60R 25/042 340/425.5 |
| 2002/0030580 | A1 * | 3/2002 | Prudholme | B60R 25/042 340/5.31 |

* cited by examiner

*Primary Examiner* — Ryan A Reis

(57) ABSTRACT

A safety device that would be installed within the fuel lines of motor vehicles including cars and trucks, with the device remotely activated by police and other law enforcement personnel to block the flow of fuel to the vehicle engine, thus disabling the vehicle to provide law enforcement officials a practical way in which to safely disable a motor vehicle in the event of a police chase, thus protecting both parties, as well as other motorists, innocent bystanders and property from the dangers that can easily occur as a result of high speed chases.

1 Claim, 1 Drawing Sheet

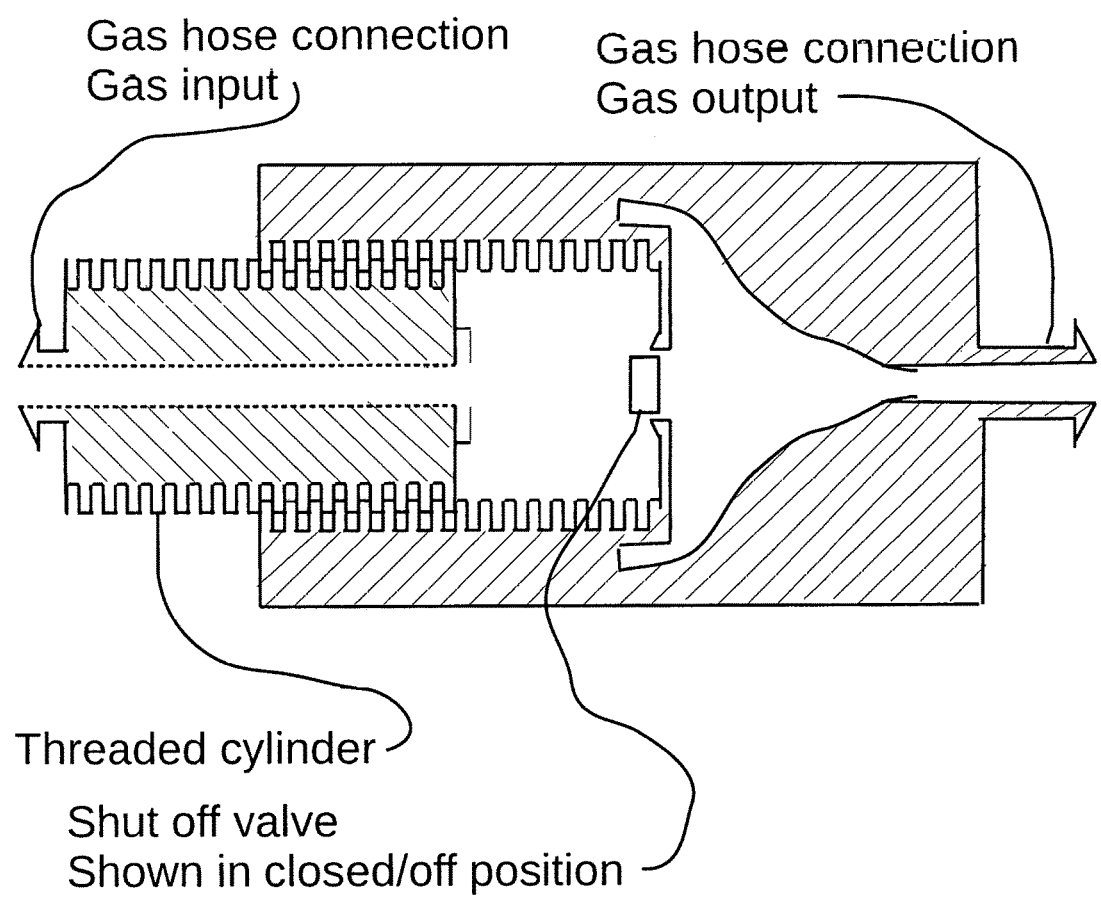

SHUT OFF GASOLINE LINE

BACKGROUND OF THE INVENTION

1. Field of the Invention

The present invention relates generally to the field of fuel shutoff valves and more specifically relates to a safety device that would be installed within the fuel lines of motor vehicles including cars and trucks, with the device remotely activated by police and other law enforcement personnel to block the flow of fuel to the vehicle engine, thus disabling the vehicle to provide law enforcement officials a practical way in which to safely disable a motor vehicle in the event of a police chase, thus protecting both parties, as well as other motorists, innocent bystanders and property from the dangers that can easily occur as a result of high speed chases.

2. Description of the Related Art

Every day, police officers and other law enforcement personnel put their lives on the line enforcing laws geared to protect the property, safety and well being of innocent civilians. When pursuing dangerous criminals, law enforcement officers often find themselves in high speed vehicle chases which occur when suspects attempt to flee a crime scene or other police inquiry. In fact, according to the Federal Bureau of Investigation, the vast majority of police pursuits occur when a criminal attempts to flee a routine traffic stop. When a high speed chase occurs, normal traffic laws are discarded by the criminal, who typically flies through red lights and stop signs, cuts off traffic and places other motorists and pedestrians at serious risk for harm. During a high speed chase, other police officers will often aid in the pursuit and attempt to regulate traffic: putting up road blocks to stop the flow of traffic and taking other measures in order to clear the road and protect civilians from the dangers associated with these endeavors.

Unfortunately, these measures are often not enough and crashes and other accidents that result in property loss and death as a result of high speed police chases occur ever day. According to the FBI, a person dies every day in the United States as a result of a police pursuit and on average a law enforcement officer is killed every 11 weeks while in pursuit. Most surprisingly, innocent civilians constitute a staggering 42 percent of persons killed or injured during police pursuits, with these persons often the victim of resulting collisions, flying debris and other dangers inherent with vehicle chases.

Various attempts have been made to solve problems found in fuel shutoff valves art. Among these are found in: U.S. Pat. No. 5,861,799 to Ryszard F. Szwed; U.S. Pat. No. 5,045,837 to Brendan G. Gosker; and U.S. Pat. No. 3,834,484 to Arlon G. Sangster et al. This prior art is representative of conditionally operated fuel shutoff valves.

None of the above inventions and patents, taken either singly or in combination, is seen to describe the invention as claimed. Thus, a need exists for a reliable Shut Off Gasoline Line a safety device that would be installed within the fuel lines of motor vehicles including cars and trucks, with the device remotely activated by police and other law enforcement personnel to block the flow of fuel to the vehicle engine, thus disabling the vehicle to provide law enforcement officials a practical way in which to safely disable a motor vehicle in the event of a police chase, thus protecting both parties, as well as other motorists, innocent bystanders and property from the dangers that can easily occur as a result of high speed chases and to avoid the above-mentioned problems.

BRIEF SUMMARY OF THE INVENTION

In view of the foregoing disadvantages inherent in the known fuel shutoff valves art, the present invention provides a novel Shut Off Gasoline Line. The general purpose of the present invention, which will be described subsequently in greater detail, is to provide a safety device that would be installed in the fuel lines of motor vehicles including cars and trucks, with the device remotely activated by police and other law enforcement personnel to block the flow of fuel to the vehicle engine, thus disabling the vehicle to provide law enforcement officials a practical way in which to safely disable a motor vehicle in the event of a police chase, thus protecting both parties, as well as other motorists, innocent bystanders and property from the dangers that can easily occur as a result of high speed chases. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The FIGURES which accompany the written portion of this specification illustrate embodiments and method(s) of use for the present invention, Shut Off Gasoline Line, constructed and operative according to the teachings of the present invention.

FIG. 1 shows a perspective view illustrating a Shut Off Gasoline Line according to an embodiment of the present invention.

The various embodiments of the present invention will hereinafter be described in conjunction with the appended drawings.

DETAILED DESCRIPTION

As discussed above, embodiments of the present invention relate to a fuel shutoff valve devices and more particularly to a Shut Off Gasoline Line a safety device that would be installed within the fuel lines of motor vehicles including cars and trucks, with the device remotely activated by police and other law enforcement personnel to block the flow of fuel to the vehicle engine, thus disabling the vehicle to provide law enforcement officials a practical way in which to safely disable a motor vehicle in the event of a police chase, thus protecting both parties, as well as other motorists, innocent bystanders and property from the dangers that can easily occur as a result of high speed chases.

Referring now to the drawings FIG. 1, the Shut Off Gasoline Line comprising a novel product offering consumers a practical solution to the aforementioned challenges. As the name implies, the Shut Off Gasoline Line comprises a specially designed stopper mechanism that would be installed in the fuel line of motor vehicles that could be remotely activated by police and other authorities when involved in a chase, thus cutting off the flow of fuel from the line to the engine and safely and slowly disabling the vehicle.

This unique mechanism would be a cylindrical shaped unit comprised of durable, rust resistant metal material. A two-piece threaded fitting, the Shut Off Gasoline Line would be an adjustable unit that would be installed inside the fuel line, with the side walls of the device resting flush against the interior side walls of the fuel line, securing the unit in place. The Shut Off Gasoline Line would feature an open, ring-like female fitting that would allow gasoline to flow through the fuel line to the vehicle engine.

A male fitting would be positioned slightly below this female fitting and would be an elongated, cylindrical plug or stopper that when in the open position would in no way encumber the flow of fuel through the fuel line. When this device is activated by a law enforcement professional, the plug would slide into the female fitting, with the circular head of the male fitting abutting flush against the sidewalls of the female fitting and thus creating a reliable seal that would block the flow of fuel to the vehicle engine. As this device would be remotely activated, a simple receiver could be incorporated into the design of the Shut Off Gasoline Line that would respond to remote transmitters located in police vehicles.

These transmitter units could be universal in design and would need only be directed at the designated vehicle involved in a chase and activated in order to power the Shut Off Gasoline Line located in the criminal's vehicle. In this manner, when the plug is inserted into the female fitting, fuel would be prevented from passing through the fuel line to the vehicle engine, with the existing fuel in the engine quickly depleted as the vehicle is in motion. As the fuel level in the engine drops, the vehicle would begin to slow, regardless of how much force is exerted on the vehicle accelerator As such, implementation of the Shut Off Gasoline Line would effectively cause the criminal's vehicle to quickly run out of gas. Police officers could then safely approach the disabled vehicle and apprehend the criminal who was attempting to flee the scene. The Shut Off Gasoline Line could operate on power supplied by the motor vehicle and thus could be wired to the vehicle's electrical system.

The Shut Off Gasoline Line would provide police offers a practical way in which to quickly disable a motor vehicle in the event a high speed chase occurs. Most importantly, because a vehicle could be so quickly disabled via the Shut Off Gasoline Line, police officers, other motorists, innocent bystanders and even the criminal himself would be protected from the dangerous hazards associated with high speed police chases. As such, a criminal could be quickly and safely brought to justice and innocent lives would be spared.

Reducing the chance of collisions or other chase-related accidents and effectively saving lives, the Shut Off Gasoline Line should be greatly appreciated by conscientious motorists everywhere. Easily installed as an aftermarket accessory or integrated at the point of vehicle manufacture, the Shut Off Gasoline Line would provide an inexpensive safety tool that could prove an invaluable commodity to any motorist or law enforcement official. The Shut Off Gasoline Line is cost-effective to produce in the embodiments, as shown in FIG. 1.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claim:

1. A shut off gasoline line, comprising:
   a safety device installed in a fuel line of a motor vehicle, said safety device comprising:
      a cylindrical shaped body made of rust resistant metal, said cylindrical shaped body having a two-piece threaded fitting, said cylindrical shaped body having side walls resting flush against interior side walls of said fuel line;
      a female fitting allowing fuel to flow through said safety device;
      a male fitting being an elongated cylindrical plug slidable within said female fitting; and
      a receiver in said safety device for communicating with a remote transmitter;
   wherein said male fitting slides into said female fitting to block fuel flow through said fuel line when said remote transmitter sends a signal to said receiver.

* * * * *